Oct. 18, 1966    F. S. SCHILER    3,279,077
SPLIT SCALE MEASURING MEANS
Filed Aug. 19, 1964    5 Sheets-Sheet 1

INVENTOR.
FREDERICK S. SCHILER
BY
J. William Freeman
ATTORNEY

Oct. 18, 1966    F. S. SCHILER    3,279,077
SPLIT SCALE MEASURING MEANS
Filed Aug. 19, 1964    5 Sheets-Sheet 2

INVENTOR.
FREDERICK S. SCHILER
BY
J. William Freeman

ATTORNEY

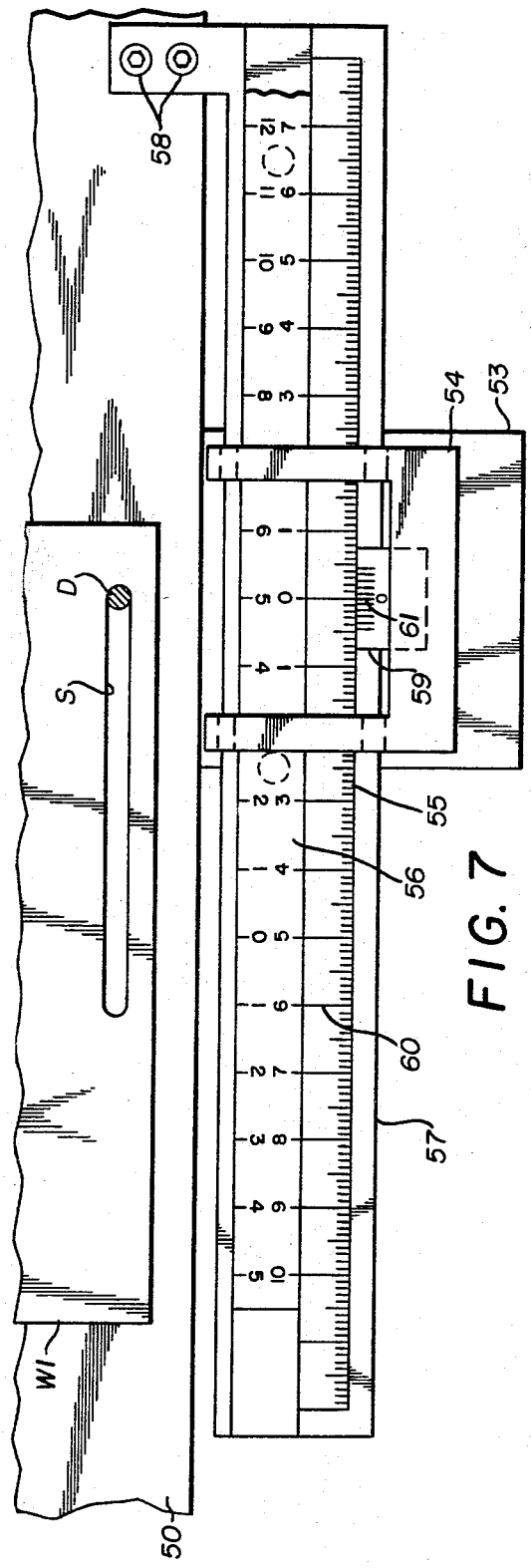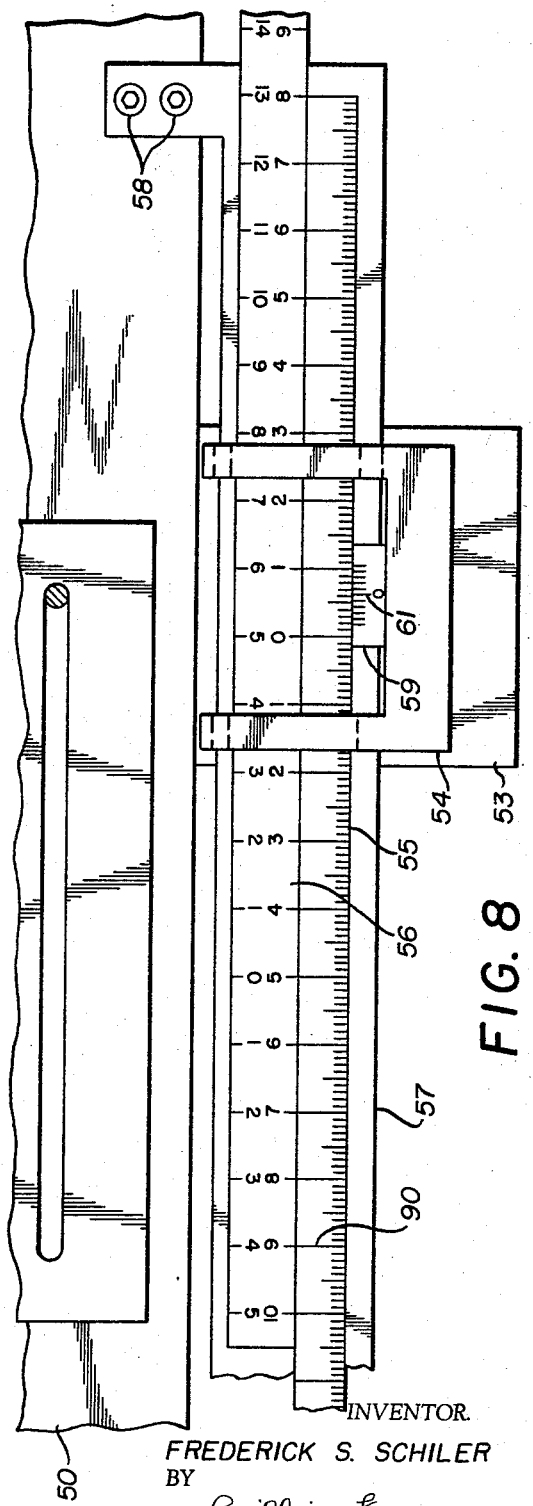

3,279,077
SPLIT SCALE MEASURING MEANS
Frederick S. Schiler, Stow, Ohio, assignor to Portage Machine Company, Akron, Ohio, a corporation of Ohio
Filed Aug. 19, 1964, Ser. No. 390,511
1 Claim. (Cl. 33—125)

This invention relates to the art of machine tools and in particular has reference to a split scale type of measuring mechanism that has particular utility in connection with the measuring of linear travel in precision measuring instruments such as layout and inspection machines that are conventionally employed to check the accuracy and contour of machined parts.

In applicant's prior U.S. Patent No. 3,069,778, there is disclosed a three dimensional layout device of the type herein being described, wherein scribing, or other indicating means, are employed for the purpose of checking the accuracy of dimensions of castings or like objects that are supported in fixed relationship on a surface table.

Further, in applicant's co-pending application, Serial No. 261,973, filed March 1, 1963 now abandoned, there is disclosed an inspection device that enables an operator to check, with extreme precision, the accuracy of bores and like surfaces especially with reference to the concentricity of the same with respect to a fixed point of measurement.

In both of the devices above described, there is relative movement between the component parts and in both instances, it is mandatory that the extent of such linear movement be carefully and accurately measured. With regard to obtaining such measurements, it has been found that the tendency of human error is greater in instances where the operator is required to make a subtraction and/or addition of the respective readings that are obtained, with such readings oftentimes being carried to three decimal places, for example.

While the above indicates the obvious advantages of providing a scale that would, at all times, read off of a zero starting point throughout any given portion of the linear travel of the machine, it has not heretofore been possible or practical to provide such a zero starting point due to the complexities involved in trying to mount an endless scale within the confines of a delicate cross arm, for example, with the accuracy of any such arrangement being less than is normally acceptable in many phases of precision machining.

It has been discovered, however, that a direct zero point of reading can be obtained at any point throughout the linear travel range of the machine tool involved by dividing the numbered scale component into two separate numbered and unnumbered scale elements, with the unnumbered bar at all times remaining fixed and with the numbered bar being shiftable relatively of the unnumbered bar and having a plurality of scale elements that have their zero points staggered so as to provide for the direct zero reading at any point in the range of machine tool travel.

Thus, and assuming machine tool travel to be twenty inches, and further assuming the numbered scale to be provided with four sets of scales, it will be seen that by using a numbered bar that is twenty-five inches long with zero points staggered at five-inch intervals from each end, that readings from zero point in either direction can be taken from any point within the range of machine tool travel.

Production of an improved split scale having the above features accordingly becomes the principal object of this invention, with other objects thereof becoming more apparent upon a reading of the following brief specification, considered and interpreted in the light of the accompanying drawings:

Of the drawings:

FIGURES 7 and 8 are schematic views illustrating alternate methods of taking direct readings from the device of FIGURE 5.

Figure 1:
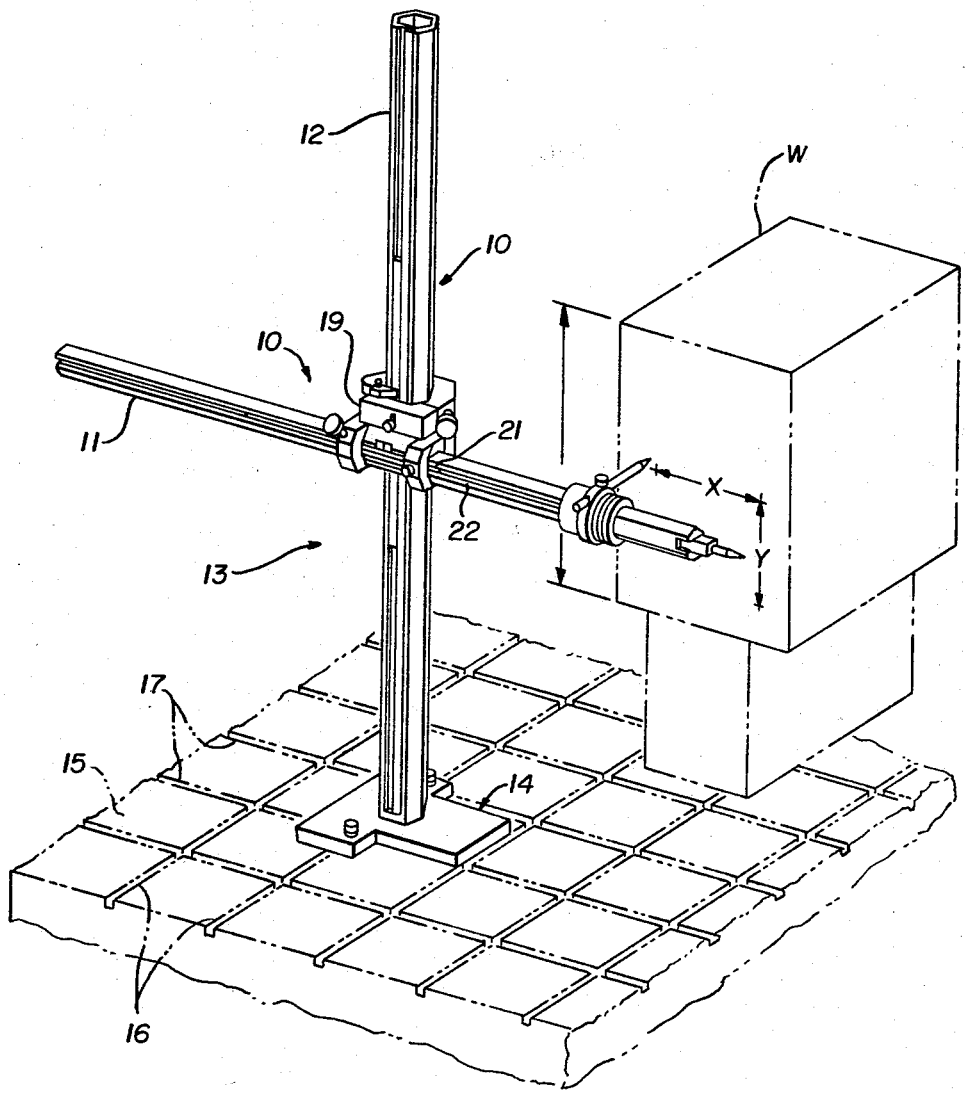
FIGURE 1 is a perspective view of a layout machine having the improved split scale measuring provided therein for measurement purposes.

Referring now to the drawings and in particular to FIGURE 1 thereof, two split scale mechanisms, both generally designated by the numeral 10, are shown carried by (1) the cross arm 11 and (2) upright arm 12 of a layout machine that is generally designated by the numeral 13, with this layout machine 13 having a base 14 that is movable through a path of straight line movement across a surface table 15 by virtue of engagement of certain base components with either guide slots 16, 16 or 17, 17 that are provided on the surface table 15.

The respective split scale measuring units 10, 10 serve to measure relative movement that occurs (1) between the adaptor bracket 19 and the cross arm 11 and (2) between the adaptor bracket 19 and upright standard 12, with operation of the layout machine of the type herein being described being more fully set forth in applicant's prior U.S. Patent No. 3,069,778.

Figure 2:
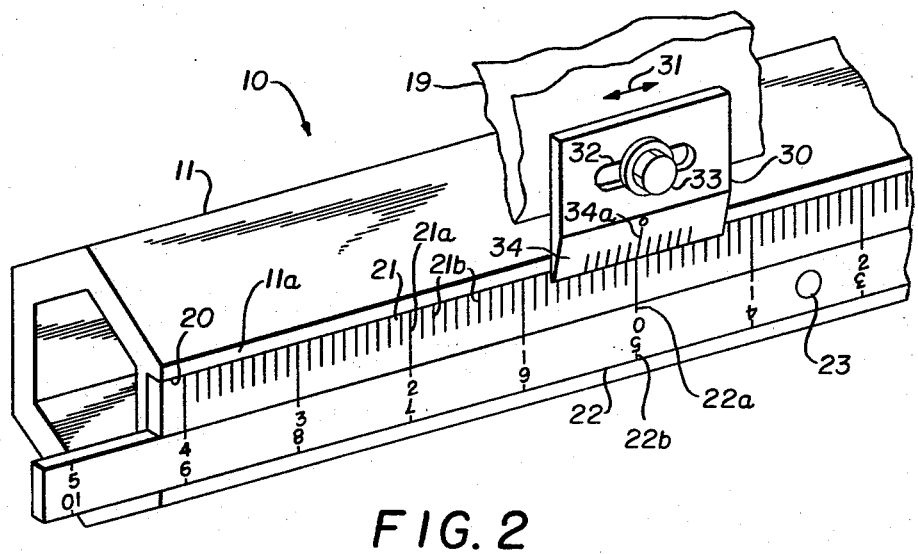
FIGURE 2 is a fragmentary perspective view showing in detail the arrangement of the split scale mechanism on the cross arm of the layout machine of FIGURE 1.
Figure 9:
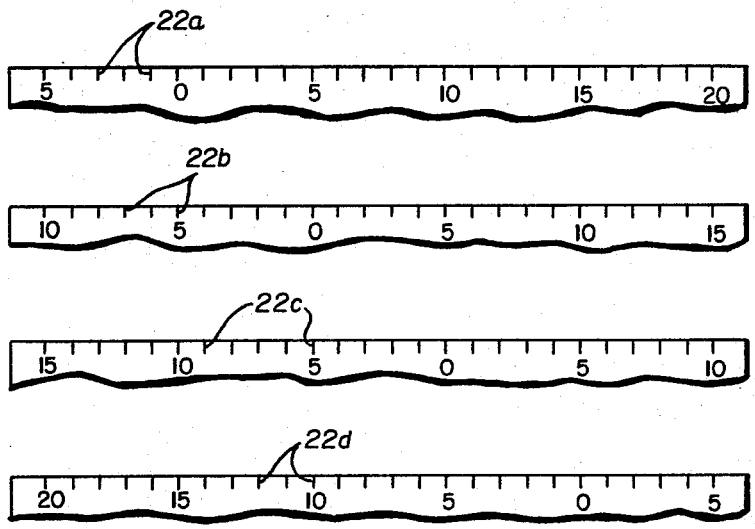
FIGURE 9 is a schematic view of the scale indicia markings provided on a numbered scale bar of the type herein being discussed.

Referring next to FIGURE 2, wherein there is illustrated in detail the split scale mechanism 10, that is associated with a cross arm 11, it will be first noted that the appropriate face 11a of cross arm 11 is undercut as at 20 to provide an elongate longitudinal recess within which the split scale components may be received, with the split scale 10, in essence, including an unnumbered scale bar 21 that is preferably bolted or otherwise secured within the recess 20, as well as a numbered scale bar 22 having each longitudinal edge provided with indicia as indicated by the numerals 22a, 22b, 22c and 22d respectively in FIGURE 9. In this regard the indicia 22a and 22b are aligned along the upper and lower edges of the face of numbered bar 22 shown in FIGURES 2, 3 and 4 of the drawings, while the indicia 22c and 22d are provided adjacent the equivalent edges on the opposed face of the scale 22 as indicated in FIGURE 9.

With reference to FIGURE 1 two such sets of scales are shown provided in the layout machine illustrated with one scale being provided on the cross arm 11 while the other such scale is provided on the upright standard 12.

Additionally, a magnet 23 or other releasable fastening means are preferably provided on scale component 22 for the purpose of securing the same in any chosen longitudinal position of coextensive alignment with the unnumbered scale component 21.

For the purpose of coacting with scale component 22 and vernier 30, the unnumbered bar has a series of main indicia lines 21a, each extending transversely thereof from edge to edge, with the spacing between adjacent main indicia 21a being identical to the spacing between the numerical indicia provided on the scale component 22 with such arrangement permitting alignment of a zero marking of scale 22 with any main indicia 21a of scale 31. Further, spaced smaller divisional markings 21b, 21b are provided between main indicia 21a, 21a adjacent the upper edge portion of scale 21 for purposes that will now be described.

In this regard and referring to FIGURE 2, the adaptor bracket 19 is shown as further including a vernier plate 30 that is shiftably mounted thereon for longitudinal adjustment in the direction of arrow 31, with such adjustment being facilitated by slot 32 and bolt 33, and with the marked edge thereof being located adjacent to the finely marked edge of scale component 21, so that the usual vernier markings 34 including zero marking 34a, can cooperate with the same in known manner.

By way of the scale arrangement just described, it will be noted that the zero element 34a of vernier 30 can be aligned with a main traverse marking 21a of the unnumbered scale 21, and further alignment can be made with zero indicia marking 22a of scale component 22b.

Figure 3:
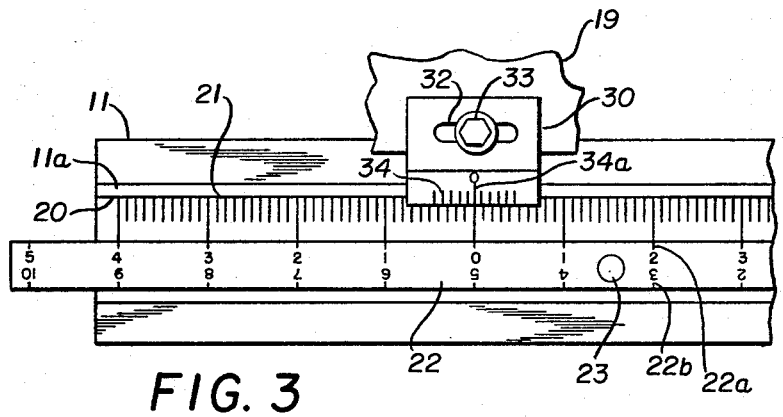
FIGURES 3 and 4 are schematic views illustrating the position of the split scale components with reference to the fixed vernier during longitudinal movement of the cross arm from point X to point Y of FIGURE 1.
Figure 4:
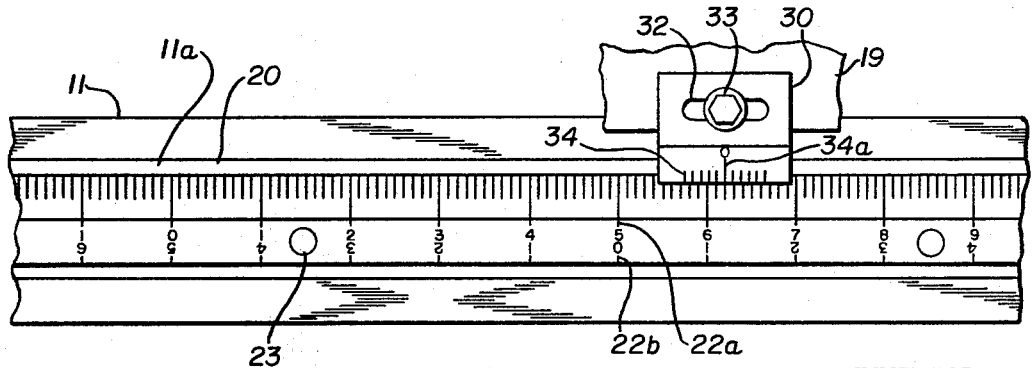

Such condition of zero reading is shown in FIGURES 2 and 3 of the drawings. While FIGURE 4 shows schematically the position of the scale components following movement in unison of the scales 21 and 22 together with the cross arm 11 through the distance of 6.20 inches. Such distance is the indicated linear distance between points X and Y, with the X reading being taken in the position of FIGURE 3, while the Y reading is taken in the position of FIGURE 4.

Figure 10:
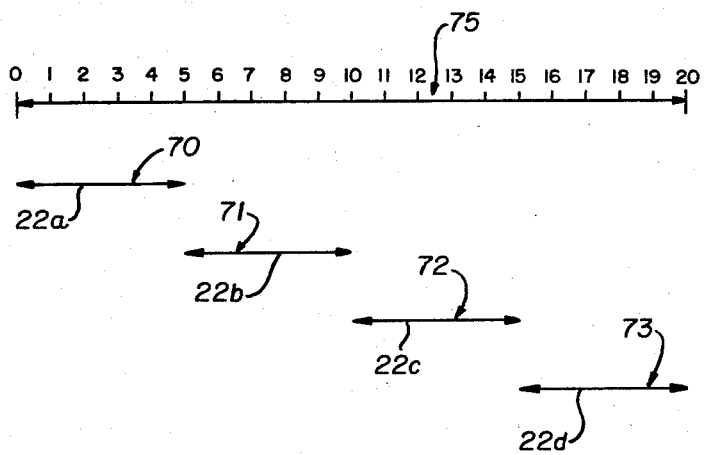
FIGURE 10 is a similar schematic view showing the range of zero positions available for locating the various zero points of the numbered scales shown in FIGURE 9.

It will be noted that the numbered scale 22 has been set to effectuate a direct reading in FIGURE 3, but it is equally apparent that if the work piece W were located to the left of FIGURE 1, the scale 22 could have another scale edge thereof appropriately positioned in adjacency with the unnumbered scale 21 so as to locate the zero reading at any specific point, with the range of locations being shown in FIGURE 10.

Figure 5:
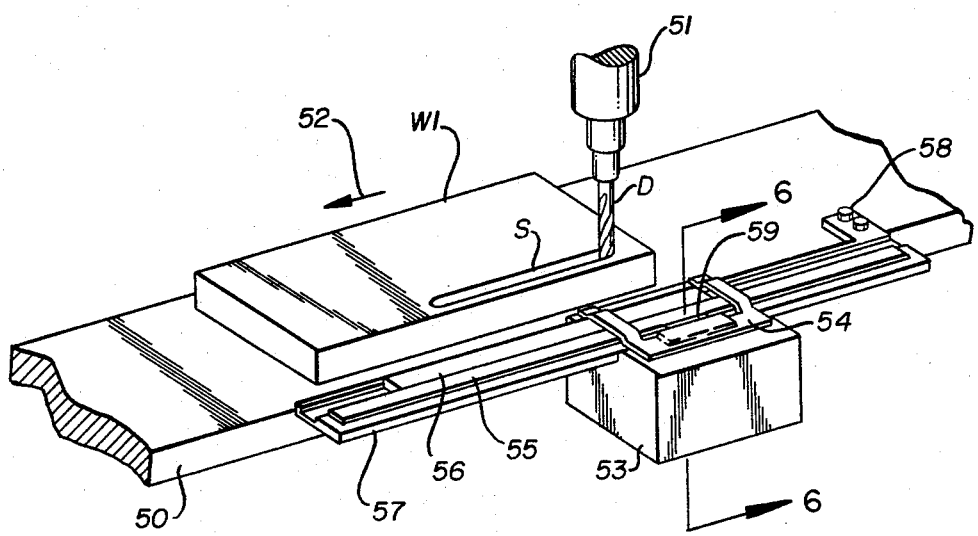
FIGURE 5 is a schematic perspective view showing use of the split scale in connection with the movable table of a machine tool, such as milling machine.
Figure 6:
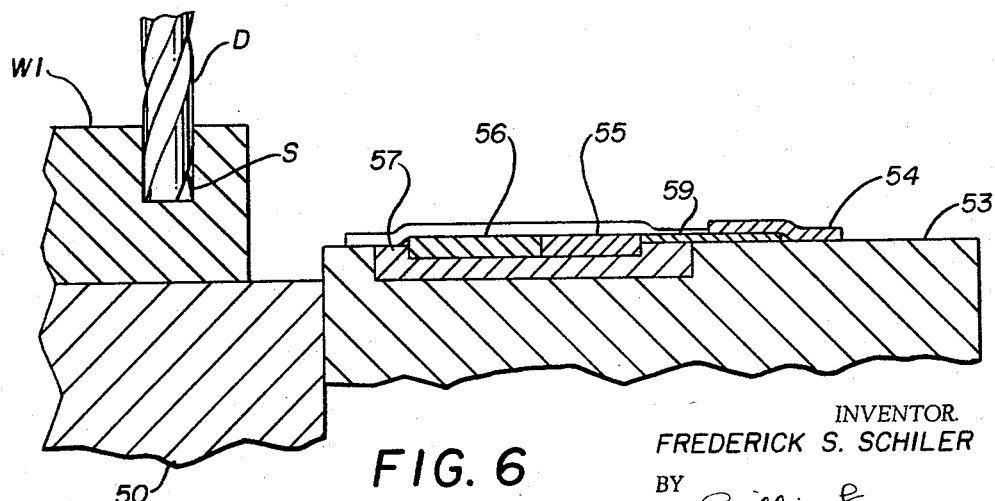
FIGURE 6 is a sectional view taken on the lines 6—6 of FIGURE 5.

The invention is further illustrated in the modifications of FIGURES 5 and 6 of the drawings, wherein a work piece W₁ is positioned on the movable transverse slide 50 of a conventional drill press unit that has drill member D being received within its driving spindle 51, and with movement of the work table 50 and work piece W₁ in the direction of arrow 52 serving to create a milled slot S.

A vernier support block 53 is fixed, in known manner, to the stationary bed of the machine, with the vernier support 53 supporting a vernier member that includes a strap-like member 54, of U-shaped configuration in plan. This member overlies the unnumbered scale component 55 and the numbered scale component 56 with the scale components 55 and 56 being appropriately received in a carrier element 57 that is bolted, as at 58, to the work table 50, so as to cause scales 55 and 56 to move in unison with work support 50 relatively of the vernier scale 59.

Representative movements of the type just described are shown in FIGURES 7 and 8, with FIGURE 7 illustrating the component parts arranged to mill a slot that has its end radii spaced exactly 6 inches on center. In FIGURE 7 a zero point is shown established so that a milled slot S, having a 6-inch length, will be created when the line 60 comes into registry with a zero vernier line 61 following movement of the work table 50 to the right of FIGURE 1.

In FIGURE 8 it will first be assumed that the slot in question is to be milled exactly 9.62 inches and in this regard the zero point of the scale 56 will first be set in registry with the zero point 61 of the vernier 59. Following this the scale can be moved to the left until the reading of .62 inch is obtained as shown clearly in FIGURE 8.

Following this the direction of movement of the scale can be reversed so as to move the scale to the right until the line 90 comes into registry with the indicia 61. At this time the appropriate slot dimension will have been achieved.

Turning next to FIGURE 9, it is first noted that each of the scales 22a, 22b, 22c and 22d are illustrated as being in its up position as required for proper alignment with the vernier scale. Thus, in scale 22a, the zero point is spaced five inches from the left hand edge of the numbered bar while in scale 22b, the spacing of the zero point is ten inches from the left hand edge. Similarly, the zero point is located ten inches and five inches respectively from the right hand edge in the representation of scale 22c and 22d shown in FIGURE 9.

Accordingly and transferring this condition to FIGURE 10, it will be noted that if the zero starting point is to be positioned within the range of arrow 70 that scale 22a will be used, while the range of arrows 71, 72 and 73 is respectively accommodated by scales 22b, 22c and 22d respectively so as to cover the overall range of travel indicated by the numeral 75 in FIGURE 10.

In practice therefore, it will be seen that the length of the numbered bar will be equal to the linear length of machine travel plus the length of machine travel divided by the number of separate staggered scales that are provided.

It will be noted from the above that the zero starting point of direct measurement can be located at any point of the machine tool travel by using one of the four numbered scales of the numbered bar in combination with an unnumbered scale that is fixed to the movable component in the form of the invention shown.

It is believed apparent that the above indicates also the practicality of the situation in that the length of the numbered bar is only slightly greater than the machine travel per se so as to avoid the necessity of using an extensively long numbered bar to achieve similar results.

It is further apparent that while four sets of scales require a numbered bar whose length is 25 percent greater than the machine travel, that if eight separate sets of scales were used, the numbered bar would only have to exceed the machine travel distance by 12½ percent.

While a full and complete description of the invention has been set forth in accordance with the dictates of the patent statutes, it is to be understood that the specific form of the invention herein shown is not intended to be limited to the specific embodiments that have been shown. Accordingly, modifications of the invention may be resorted to without departing from the spirit hereof or the scope of the appended claim.

What is claimed is:

A device for measuring the linear travel of a movable machine component with respect to a relatively fixed base component, comprising:
  (1) an elongate scale support of recessed cross section
     (a) carried by one said component,
     (b) having first and second elongate scale receiving surfaces;
  (2) a first rigid scale member releasably connected to and supported on said first scale receiving surface in normally non-shiftable relationship therewith and having unnumbered indicia thereon that extend transversely thereof from longitudinal edge to longitudinal edge;
  (3) a second rigid scale member adjustably supported on said second scale receiving surfaces and having a plurality of numbered scale indicia provided adjacent at least two opposed longitudinal edges thereof with said scale indicia being numbered from zero starting points and with the zero starting points of said indicia being respectively located at varying distances from one said end of said second scale member and with one said scale indicia registering with one longitudinal edge of said first scale when supported on said second scale receiving surface;
(4) said first scale member and a wall portion of said scale support coacting to form a guide channel within which said second scale member may be shifted;
(5) a third scale element
   (a) carried by said remaining component,
   (b) having a vernier relationship with the remaining edge of said first scale member;
(6) said first, second and third scales having their registered edges disposed in coplanar relationship with each other.

References Cited by the Examiner
UNITED STATES PATENTS

| | | | |
|---|---|---|---|
| 2,616,181 | 11/1952 | Van Doorne | 33—107 |
| 2,932,899 | 4/1960 | Arzoian | 33—169 |
| 2,936,526 | 5/1960 | Dupre | 33—170 |
| 3,069,778 | 12/1962 | Schiler | 33—169 X |
| 3,108,381 | 10/1963 | Kuebler | 33—32 |
| 3,129,512 | 4/1964 | Schiler | 33—169 X |

FOREIGN PATENTS

| | | |
|---|---|---|
| 435,511 | 12/1911 | France. |
| 1,154,094 | 10/1957 | France. |
| 26,318 | 12/1903 | Great Britain. |
| 430,934 | 6/1935 | Great Britain. |
| 726,856 | 3/1955 | Great Britain. |
| 547,170 | 8/1956 | Italy. |

LEONARD FORMAN, *Primary Examiner.*

ISAAC LISANN, *Examiner.*

B. DONAHUE, H. N. HAROIAN,
                       *Assistant Examiners.*